US008899407B2

(12) United States Patent
Harrington (10) Patent No.: US 8,899,407 B2
(45) Date of Patent: Dec. 2, 2014

(54) SYSTEM AND METHOD FOR ORIENTING BUNDLES (75) Inventor: Michael Harrington, Spokane, WA (US)

(73) Assignee: J&L Group International, LLC, Keithville, LA (US)

(*) Notice: Subject to any disclaimer, the term of this patent is extended or adjusted under 35 U.S.C. 154(b) by 408 days.

(21) Appl. No.: 13/166,252

(22) Filed: Jun. 22, 2011

(65) Prior Publication Data
US 2012/0031732 A1 Feb. 9, 2012

Related U.S. Application Data (60) Provisional application No. 61/370,189, filed on Aug. 3, 2010.

(51) Int. Cl.
*B65G 47/244* (2006.01)
*B65H 9/16* (2006.01)
*B65H 15/02* (2006.01)
*B65G 47/08* (2006.01)

(52) U.S. Cl.
CPC ........ *B65H 15/02* (2013.01); *B65H 2701/1764* (2013.01); *B65H 9/16* (2013.01); *B65H 2301/33216* (2013.01); *B65G 47/086* (2013.01); *B65G 47/244* (2013.01); *B65H 2301/42264* (2013.01)
USPC ...... 198/779; 198/410; 198/457.02; 198/782; 198/786

(58) Field of Classification Search
USPC ............ 198/376, 410, 412, 414, 416, 457.01, 198/457.02, 779, 782, 786, 789; 193/35 MD, 35 SS
See application file for complete search history.

(56) References Cited

U.S. PATENT DOCUMENTS

| 2,897,948 | A | * | 8/1959 | Cranston, Jr. | 198/401 |
| 4,519,493 | A | * | 5/1985 | Dyer | 198/414 |
| 4,852,721 | A | * | 8/1989 | Stille | 198/782 |
| 5,000,305 | A |   | 3/1991 | Lucas | |
| 5,240,102 | A | * | 8/1993 | Lucas | 198/456 |
| 5,293,984 | A | * | 3/1994 | Lucas | 198/414 |
| 6,065,665 | A | * | 5/2000 | McKinnon et al. | 228/135 |
| 6,075,924 | A |   | 6/2000 | Will | |
| 6,378,690 | B1 | * | 4/2002 | Pessina et al. | 198/414 |
| 6,694,220 | B1 | * | 2/2004 | Tanz | 700/226 |
| 7,007,792 | B1 |   | 3/2006 | Burch | |
| 7,111,722 | B2 | * | 9/2006 | Burch | 198/411 |
| 7,216,759 | B2 |   | 5/2007 | Rau et al. | |
| 7,857,118 | B2 | * | 12/2010 | Jans et al. | 198/411 |
| 8,312,981 | B2 | * | 11/2012 | Franz | 198/370.09 |
| 2006/0249354 | A1 |   | 11/2006 | Riddick et al. | |

FOREIGN PATENT DOCUMENTS

EP 1 277 675 1/2003
EP 1 980 507 10/2008

* cited by examiner

*Primary Examiner* — Douglas Hess
(74) *Attorney, Agent, or Firm* — Dorsey & Whitney LLP (57) ABSTRACT The present disclosure relates to a bundle orienting device in-line with a conveyor configured for transporting bundles in a conveying direction. The bundle orienting device can include a plurality of selectively actuatable orientation elements that, collectively, laterally and/or angularly displace a bundle as it travels in the conveying direction through the bundle orienting device. In addition, the present disclosure relates to a method for rotating bundles traveling in a conveying direction along a conveyor system. The method includes conveying a bundle along a conveyor to pass through a bundle orienting device, thus described.

20 Claims, 8 Drawing Sheets

SYSTEM AND METHOD FOR ORIENTING BUNDLES

CROSS-REFERENCE TO RELATED APPLICATION(S)

This application claims priority of U.S. Prov. Pat. Appl. No. 61/370,189, filed Aug. 3, 2010, which is hereby incorporated herein by reference in its entirety.

FIELD OF THE INVENTION

The present disclosure relates generally to a bundle orientation apparatus and method and more specifically to a bundle orientation apparatus and method for use in forming individual tiers or layers of bundles that are to be successively placed one upon another to form a stack.

BACKGROUND OF THE INVENTION

Manufacturers of corrugated paper products, such as corrugated boxes, trays, and flat corrugated sheets, typically arrange their product in bundles. The bundles are arranged in layers, or tiers, and stacked vertically to form loads of the product for transportation to customers. To facilitate load stability, the bundles that comprise each layer are often positioned in a pattern such that at least one of the bundles is rotated 90 degrees relative to the other bundles of the layer. The load is usually stacked on a pallet and banded together to facilitate handling of the load.

Current methods for arranging the bundles into layers involve transporting the bundles via a conveyor to a stack build area and, during transport, providing various positioning apparatuses, such as stationary and/or moving rails, poles, plates, etc., that contact the bundles such that the bundles are moved laterally and/or rotated to a desired position. These current methods have several limitations. For example, particularly with respect to rotation of the bundles, the methods require stopping and starting of the transport conveyor. In addition to slowing the production rate, such stoppages and restarts contribute to bundle degradation, caused by the individual sheets of the bundle sliding relative to one another, additional wear on the machinery, and additional energy consumption. A further limitation or disadvantage of current methods includes the inability of the positioning apparatuses to process multiple bundles simultaneously.

Accordingly, there is a need in the art for a bundle arrangement apparatus and method that allows for increased processing rates while maintaining the quality of the bundles and the individual sheets that comprise the bundle.

BRIEF SUMMARY OF THE INVENTION

In one embodiment, the present disclosure relates to a bundle orienting device in-line with a conveyor configured for transporting bundles in a conveying direction. The bundle orienting device can include a plurality of selectively actuatable orientation elements that, collectively, laterally and/or angularly displace a bundle as it travels in the conveying direction through the bundle orienting device.

In another embodiment, the present disclosure relates to a system for transporting and reorienting bundles. The system can include a conveyor configured for transferring bundles to a stack build zone and a bundle orienting device. The bundle orienting divides the conveyor into an upstream conveyor and a downstream conveyor and has a plurality of selectively actuatable orientation elements that, collectively, laterally and/or angularly displace a bundle as it travels in the conveying direction through the bundle orienting device.

In still another embodiment, the present disclosure relates to a method for rotating bundles traveling in a conveying direction along a conveyor system. The method may include conveying a bundle along a conveyor to pass through a bundle orienting device. The bundle orienting device includes a plurality of selectively actuatable orientation elements that, collectively, laterally and/or angularly displace the bundle as it travels in the conveying direction through the bundle orienting device.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates novel and advantageous bundle orientation apparatus and methods and more specifically to novel and advantageous bundle orientation apparatus and methods for use in forming individual tiers or layers of bundles that are to be successively placed one upon another to form a stack. The systems and methods disclosed herein may be used, for example, by manufacturers of corrugated paper products to more efficiently arrange bundles of the products into layered stacks. For example, the systems and methods disclosed herein may increase the rate at which the layers and thus, the stacks, are formed.

Figure 1:
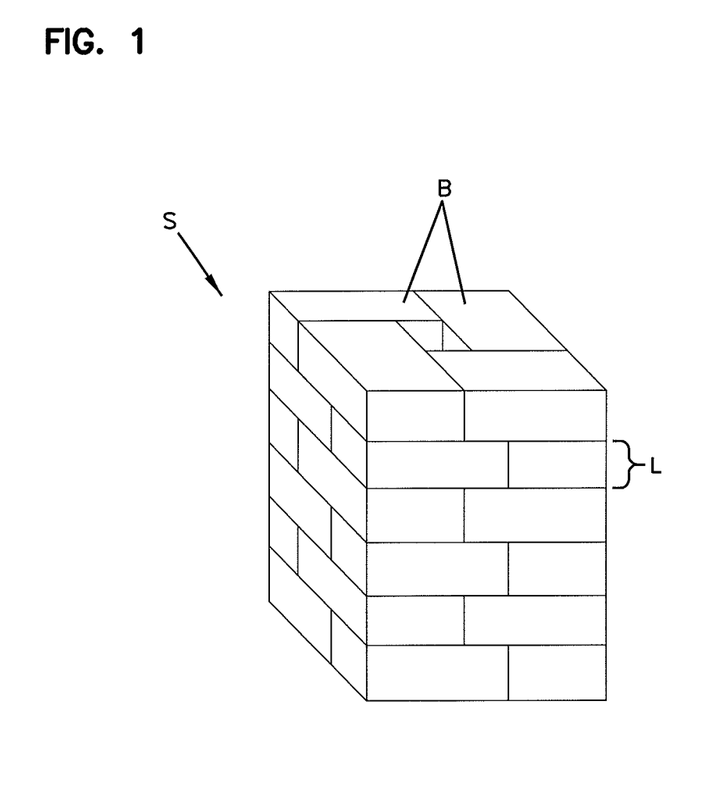
FIG. 1 illustrates a perspective view of a stack of individual bundles of a type that may be formed by employing the systems and methods disclosed herein.

FIG. 1 illustrates a perspective view of a stack S of individual bundles B of a type that may be formed by employing the systems and methods disclosed herein. As shown, the bundles B are gathered in groups forming individual tiers or layers L, successively placed one upon another to form the stack S. The layers L are defined by an arrangement of individual bundles B, wherein at least one bundle B may be rotated relative to the other bundles of a layer L. Of course, it is recognized that in some embodiments, the bundles that define a layer L may not be rotated relative to one another, or a single bundle B may define a layer L. The arrangement of the bundles B that comprise a layer L may be referred to as the layer pattern. As the stack S is formed, the layer patterns may vary, such as by alternating layer patterns in adjacent layers. As will be recognized by those skilled in the art, bundle arrangement in this manner may increase the stability of the stack S. It is to be appreciated that the layer and stack patterns depicted in FIG. 1 are provided by way of illustration only, and that any desired layer or stack patterns are within the scope of the present disclosure.

Figure 2:
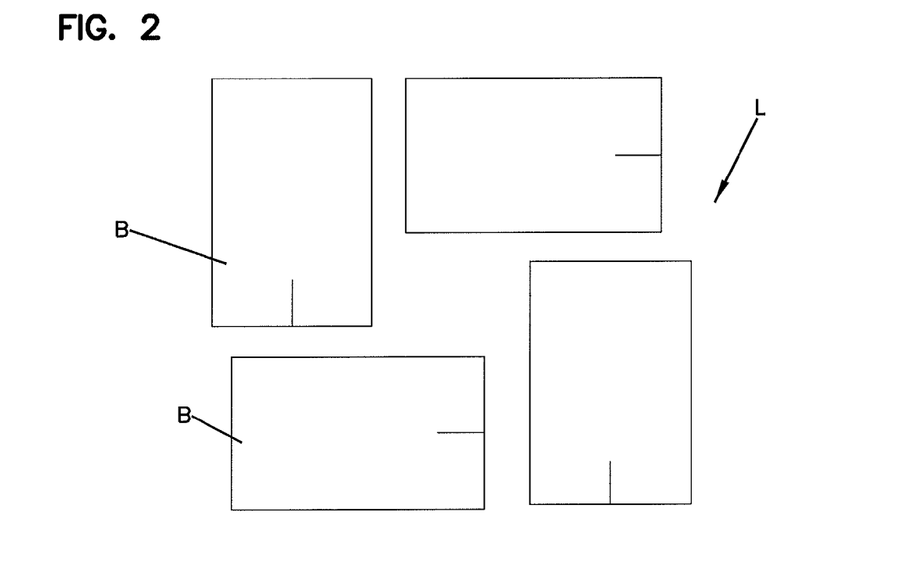
FIG. 2 illustrates an elevation top view of a schematic of a layer of bundles.
Figure 3:
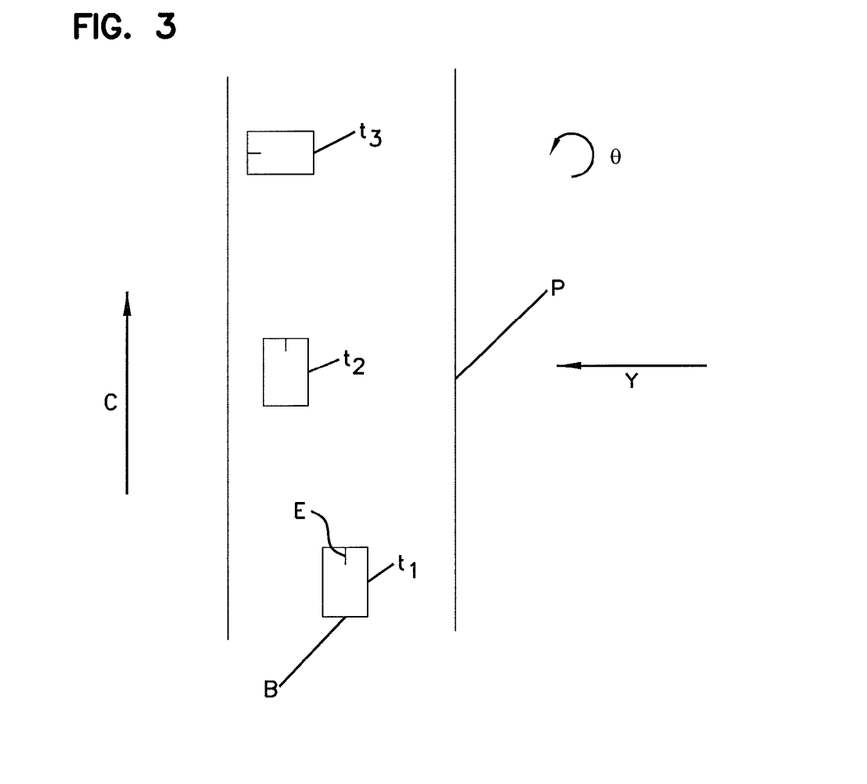
FIG. 3 illustrates an elevation top view of a schematic of a bundle being reoriented as it is transported along a conveying path.

FIG. 2 illustrates an elevation top view of a schematic of a layer L of bundles B. As will be recognized by those skilled in the art, to form the pattern of layer L, the bundles B are transported to a designated location (e.g., a stack build zone) and at some point during transport oriented relative to one another to form the desired pattern. FIG. 3 illustrates an elevation top view of a schematic of a bundle B being reoriented as it is transported along a conveying path P, the bundle B being shown at times $t_1$, $t_2$, and $t_3$. As shown, at time $t_1$, the bundle B is in an initial position. At time $t_2$, the bundle B has been advanced in the conveying direction C, and moved laterally in a direction Y. At time $t_3$, the bundle B has been advanced further in the conveying direction C and rotated counterclockwise in a direction Θ approximately 90 degrees (i.e., it has been rotated to an angular orientation in which the leading edge, indicated by dash E, is substantially parallel to the conveying direction). Through such lateral and rotational movements (which may or may not be independent), the bundles that make up a layer L may be transported along a conveying path and oriented relative to one another to form the desired layer pattern. Generally, the systems and methods disclosed herein may allow for such lateral and rotational movements to be carried out while maintaining movement of the bundles in the conveying direction C.

Figure 4:
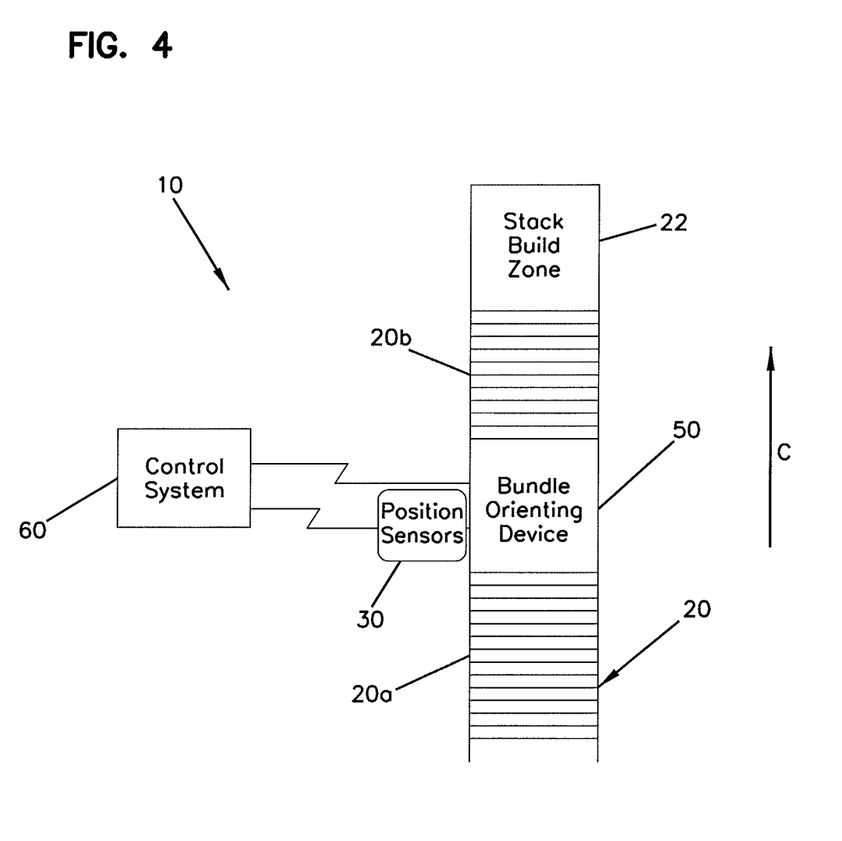
FIG. 4 illustrates an elevation top view of a schematic of an example system environment for carrying out the systems and methods of the present disclosure.

FIG. 4 illustrates a schematic diagram of one system environment 10 for carrying out the systems and methods of the present disclosure. The system environment 10 may include a conveyor 20, one or more position sensors 30, a bundle orienting device 50, and a control system 60, the control system 60 being in communication with the position sensors 30 and orienting device 50. The bundle orienting device 50 may be interposed between an upstream section 20a and a downstream section 20b of the conveyor 20. Collectively, the upstream conveyor 20a, downstream conveyor 20b, and the bundle orienting device 50 may define a conveying path for transporting bundles. In illustrative embodiments, the orienting device 50 may be configured to receive one or more bundles from the upstream conveyor 20a, having a given lateral and angular position with respect to the conveying path, and reorient the bundles by laterally and/or rotatably displacing the bundles, while maintaining advancement of the bundles in the conveying direction.

The conveyor 20 may be configured and operable for transferring bundles of material in a conveying direction C to the bundle orienting device 50 and from the bundle orienting device 50 to a stack build zone 22. The conveyor 20 may be a roller conveyor. The conveyor 20 may also be a belt conveyor, such as a belt conveyor that includes a single belt extending across the width of the apparatus, or a plurality of laterally spaced individual belt conveyors or belt conveyor sections. Alternatively, the conveyor 20 may be any type of conveying mechanism suitable to convey the type of material being conveyed. In one implementation, the bundles may comprise sheets of paper or corrugated material of selected length and width stacked into bundles of a selected height. Alternatively, the bundles may comprise any stackable objects such as, for example, boxes, crates, bags, bales, discrete stacks of articles, individual products, and the like.

Optional position sensors 30 may be positioned proximate the conveyor 20 and/or the bundle orienting device 50 for sensing the position of bundles along the conveying path. In embodiments where position sensors are used, the position sensors may be, for example, photodetectors, laser sensors, camera/vision systems, or the like. The sensors 30 may be in communication with the control system 60 for communicating information regarding the position of the bundles traveling along the conveying path, such as for providing a signal to the control system 60 for a timely movement of the components of the bundle orienting device 50. For example, in one embodiment, the sensors 30 may be positioned and configured to detect, in one or more positions along the length of the bundle orienting device 50, leading and/or trailing edges of the bundles, lateral position of the bundles, and/or angular position of the bundles as the bundles are being conveyed along the orienting device 50.

Figure 5:
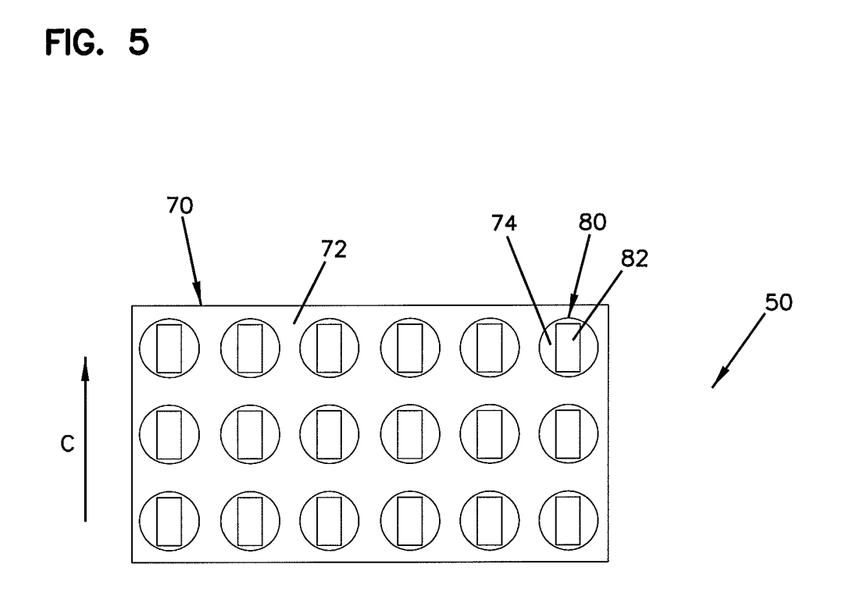
FIG. 5 illustrates an elevation top view of a schematic of a bundle orienting device in accordance with one embodiment of the present disclosure.
Figure 6:
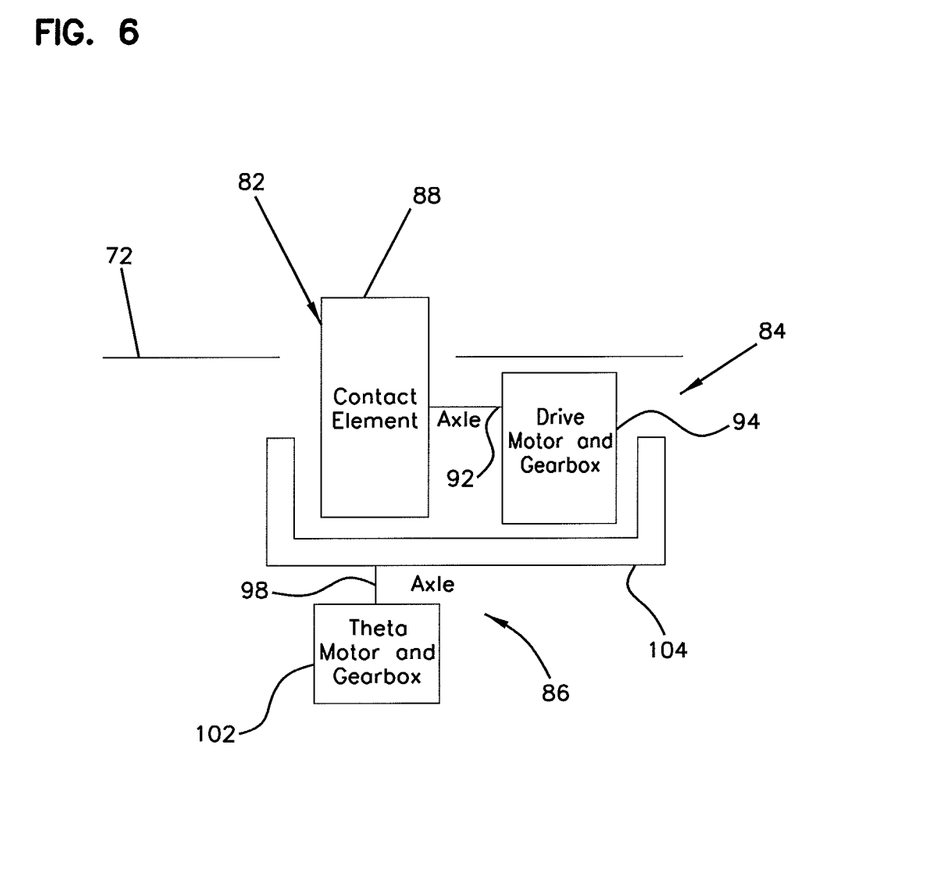
FIG. 6 illustrates an elevation side view of a schematic of a bundle orienting device in accordance with one embodiment of the present disclosure.

FIGS. 5 and 6 depict elevation top and side views, respectively, of a schematic of a bundle orienting device 50 in accordance with one embodiment of the present disclosure. The bundle orienting device 50 may include a support structure 70 and an array of orientation elements 80 mounted to the support structure.

The support structure 70 may be formed as a rigid or semi-rigid structure having a substantially planar top surface 72 (e.g., a table-like structure). A plurality of apertures 74 extending through the thickness of the top surface 72 may be formed in the support structure 70 for accommodating at least a portion of the orientation elements 80. As shown, the apertures 72 may be formed as an array of substantially aligned rows and columns. Alternatively, either or both of the rows and columns of the array may be offset relative to one another. As further alternatives, the apertures 72 may be formed in a random or semi-random pattern, or in any desired configuration. It is to be appreciated that the number of apertures 72 and the spacing between adjacent apertures 72, and thus the number and spacing of the orientation elements 80, may be selected based on, for example, the bundle dimensions, the bundle material type, or the like.

The orientation elements 80 may include a bundle contacting element 82, a translation drive 84, and a rotation drive 86, each of the translation drive 84 and the rotation drive 86 being operatively coupled to the bundle contacting element 82.

The bundle contact element 82 may be positioned with respect to the apertures 74 of the support structure 70 such that an upper-most contacting surface 88 of the contact element 82 extends in a plane that is above the plane of the top surface 72, and which is substantially coplanar with the conveying surface of the conveyor 20. In this manner, the conveyor 20 may bring the bundles into contact with the contacting surfaces 88 of the contact elements 82 such that movement of the bundles along the portion of the conveying path defined by the orienting device 50 is controlled by the movement of the contact elements 82.

The contact elements 82 may be configured in any shape suitable for transferring movement of the contact elements 82 into movement of the bundles, such as by means of a friction force. For example, the contact elements 82 may be configured as wheels (shown in FIGS. 5 and 6), spherical rollers, roller bars and like structures, balls, toothed wheels, other suitable structures, or any combination thereof. The contact elements 82 may be formed from a material, or the outer surfaces of the contact elements 82 may be fitted with a material, that facilitates the transfer of movement of the contact elements into movement of the bundles. For example, the contact elements 82 may be formed from, or the outer surfaces fitted with, a suitable rubber, plastic, or the like.

The translation drive 84 may include a rotation shaft or axle 92 that is coupled to and driven by a motor and gearbox unit 94 or other suitable drive mechanism, such as but not limited to a pneumatic or hydraulic drive, electro-linear drive, or any combinations thereof. The axle 92 may be further coupled to the contact element 82 such that rotation of the shaft causes a corresponding rotation of the contact element 82. The axle may be coupled to the contact element directly, or through one or more intermediate members that are directly coupled to the contact element 82. In this manner, the translation drive 84 may effect rotational movement of the contact element 82 about a roller axis that extends substantially parallel to the plane defined by the top surface 72 of the support structure 70, and extends centrally through the contact element 82. Of course, the particular roller axis will depend on the angular orientation of the contact element which, as discussed below, may be effected by the rotation drive 86. For example, for an angular orientation of the contact elements 82 as depicted in FIG. 5, the roller axis for each of the contact elements 82 extends substantially perpendicularly with respect to the conveying direction C.

In one embodiment, the bundle contact element 82 and the translation drive 84 may be provided in a housing such the bundle contact element 82 and the translation drive 84 form an integrated unit. The integrated unit may be mounted to the underside of the support structure 70 with a suitable fastening mechanism such that the integrated unit remains free to rotate about an axis that extends substantially perpendicular to the plane defined by the top surface 72 of the support structure 70. Alternatively, these elements may be provided as separate structures and similarly mounted to the support structure. In a further alternative, the integrated unit, or the separate components may be supported relative to the support structure 70 by a separate body that is mounted to the underside of the support structure 70 with a suitable fastening mechanism.

The rotation drive 86 may include a rotation shaft or axle 98, which may be coupled to and driven by a motor and gearbox unit 102 or other suitable drive mechanism, such as but not limited to a pneumatic or hydraulic drive, electro-linear drive, or any combinations thereof, and a rotating body 104. The axle 98 may be further coupled, directly or via one or more intermediate members, to the rotating body 104. The rotating body 104 may be coupled to the contact element 82 and the translation drive 94 such that a rotational movement of the rotating body 104 is transferred to the contact element 82 and the translation drive 94. For example, the rotating body 104 may be coupled to the contact element 82 and the translation drive 94, separately or as an integrated unit, with a suitable fastener, adhesive, or the like. Through this coupling, rotation of the shaft 98 may cause a corresponding rotation of the contact element 82 about a rotational axis that extends substantially perpendicular to the plane defined by the top surface 72 of the support structure 70. In one embodiment, a rotational axis of the axle 98 may be substantially aligned with a central axis of the contact element 82.

While the foregoing has been described with respect to embodiments in which each contact element 82 is driven by a translation drive 84 and a rotation drive 86, in one embodiment, one or more contact elements 82 may be driven by the same translation drive 84 and/or rotation drive 86. Additionally or alternatively, one or more contact elements 82 may simply be provided without any associated translation drive 84 and/or rotation drive 86. For example, each row of contact elements 82 may be driven with a single translation drive 84 and/or rotation drive 86, or half of the contact elements 82 in a row may be driven with a first translation drive 84 and/or rotation drive 86 while the other half of the contact elements 82 in a row may be driven with a second translation drive 84 and/or rotation drive 86, or any other suitable combination of contact elements 82 may be driven with a single translation drive 84 and/or rotation drive 86 irrespective of the remaining contact elements. Similarly, in some embodiments where one or more of the contact elements 82 are provided without a translation drive 84 and/or rotation drive 86, such non-driven or partially non-driven contact elements may be mounted to the support structure 70 such that they remain free to rotate about the same axes discussed above. For example, in a given row or column, the contact elements 82 may be alternated between driven and non-driven contact elements. In this manner, costs and weight associated with the manufacture of the bundle orienting device 50 may be reduced.

Figure 7:
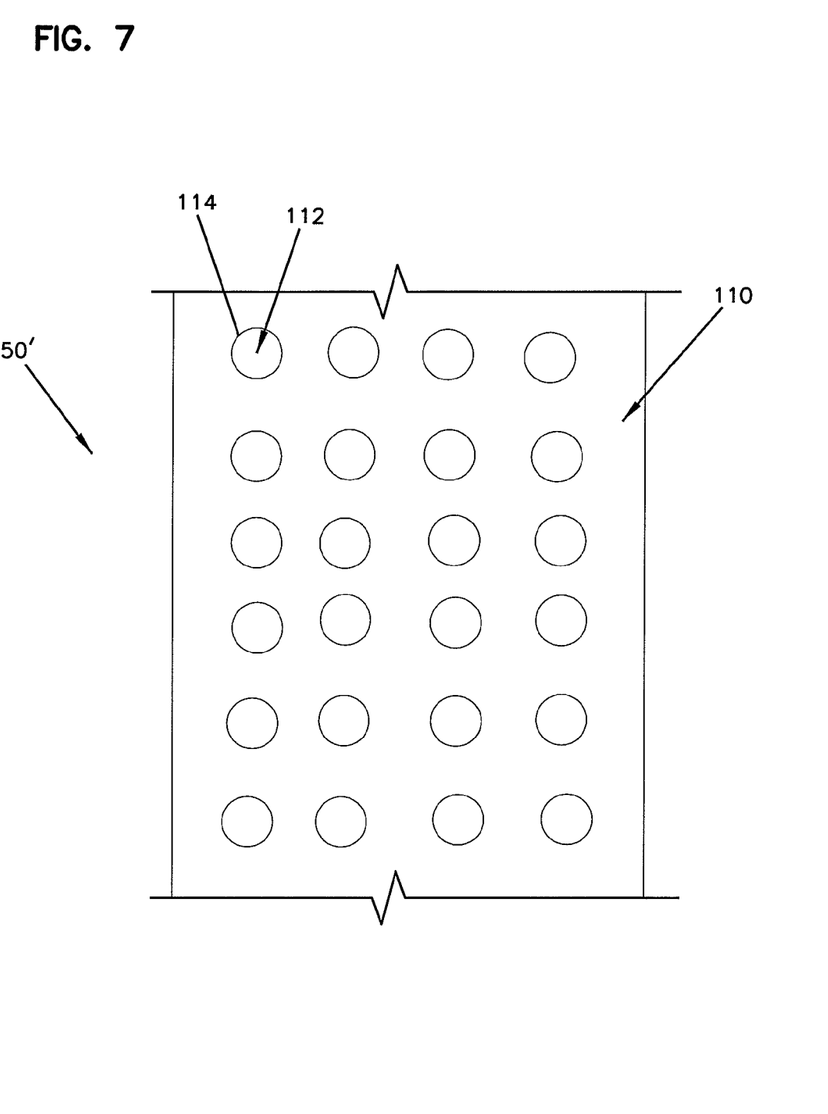
FIG. 7 illustrates an elevation top view of a schematic of a bundle orienting device in accordance with another embodiment of the present disclosure.
Figure 8:
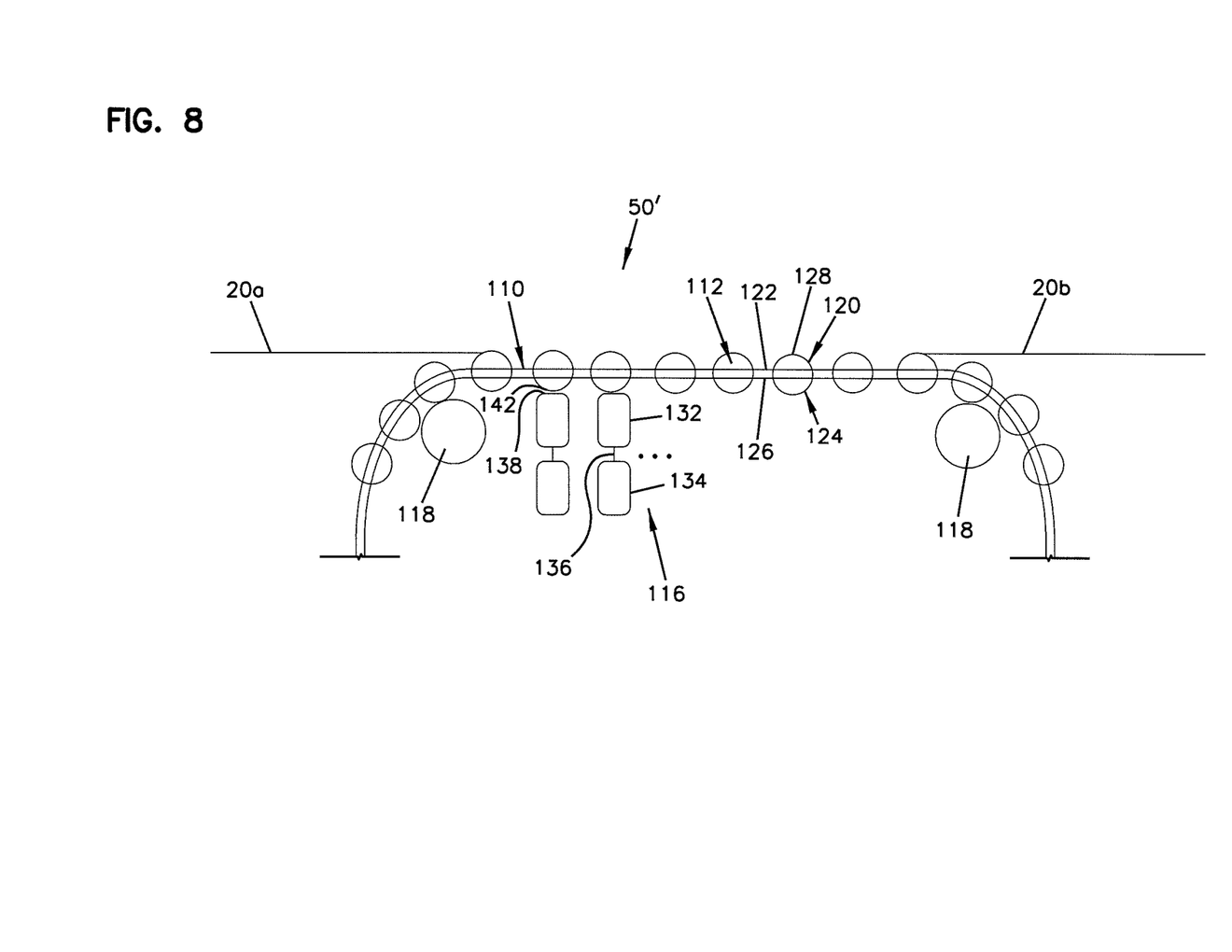
FIG. 8 illustrates an elevation side view of a schematic of a bundle orienting device in accordance with another embodiment of the present disclosure.

FIGS. 7 and 8 depict elevation top and side views, respectively, of a schematic of a bundle orienting device 50' in accordance with another embodiment of the present disclosure. The bundle orienting device 50' may include a conveyor belt 110, a plurality of roller elements 112 rotatably retained in cavities 114 of the conveyor belt 110, and a plurality of translation drives 116 operatively associated with the roller elements 112. Generally, the bundle orienting device 50' may be configured such that movement of the belt 110 carries the bundles in the conveying direction, and movement of the roller elements 112 effects the lateral and/or angular position of the bundles along the conveying path. The movement of the roller elements 112 may also contribute to movement of the bundles in the conveying direction C.

The conveyor belt 110 may be operatively coupled to a drive mechanism for moving the conveyor belt 110 in the conveying direction C such as, for example, one or more rollers 118 and a drive motor. The conveyor belt 110 may be formed as a single continuous belt, or as a modular conveyor belt that includes a plurality of linked modules. In one embodiment, the conveyor belt 110 may be an endless belt.

A plurality of cavities 114 extending through the thickness of the conveyor belt 110 may be provided for rotatably accommodating the roller elements 112. As shown, the cavities 114 may be formed as an array of substantially aligned rows and columns. Alternatively, either or both of the rows and columns of the array may be offset relative to one another. As further alternatives, the cavities 114 may be formed in a random or semi-random pattern, or in any desired configuration. It is to be appreciated that the number of cavities 114, the spacing between adjacent cavities 114, and the size of the cavities 114, and thus the number, spacing, and size of the roller elements 112, may be selected based on, for example, the bundle dimensions, the bundle material type, or the like.

As shown in FIGS. 7 and 8, the roller elements 112 may be configured as spherical rollers (e.g., balls). However, the roller elements 112 may also be configured as wheels, roller bars, toothed wheels, like structures, or any combination thereof.

The roller elements 112 may be positioned in the cavities 114 such that a first surface 120 extends above a plane defined by a top surface 122 of the belt 110 and a second surface 124 extends below a plane defined the bottom surface 126 of the belt 110. The roller elements 112 may contact bundles being transported on the belt 110 at a first contacting point 128, which is part of the first surface 120 of the roller element 112. In one embodiment, the first contacting point 128 may be substantially coplanar with the conveying surface of the conveyor 20 such that the bundles may be transferred from the upstream conveyor 20a to the roller elements 112 and ride atop the roller elements 112 as they are being transported along the orienting device 50'. As is seen from FIG. 8, in some embodiments, at any given point only a portion of the conveyor belt 110 may be available for transporting bundles. Specifically, only the portion of the conveyor belt 110 that extends substantially parallel to the plane of the conveying surface of the conveyor 20 and that is positioned above the translation drives 116 may be available for transporting bundles. This portion of the conveyor belt 110 may be referred to as the bundle transport region.

The roller elements 112 may be accommodated in the cavities 114 such that they are rotatable about a roller axis that extends substantially parallel to the plane defined by the top surface 122 of the belt 110, and extends centrally through the roller element 112. The particular roller axis will depend on the angular orientation of the roller element 112, which may be fixed or variable. In one embodiment, the roller axis of one or more of the roller elements 112 may extend substantially perpendicular to the conveying direction C.

The translation drives 116 may include a contacting element 132 and a motor and gearbox unit 134 or other suitable drive mechanism, such as but not limited to a pneumatic or hydraulic drive, electro-linear drive, or any combinations thereof, which is operatively coupled to the contacting element 132, such as by a rotation shaft or axle 136. For example, the axle 136 may be coupled to the contact element 132 such that rotation of the axle 136 causes a corresponding rotation of the contact element 132. The axle 136 may be coupled to the contact element 132 directly, or through one or more intermediate members that are directly coupled to the contact element 132.

The translation drives 116 may be mounted proximate the underside of the belt 110 such that a top surface 138 of the contact elements 132 contacts a second contacting point 142 of the roller elements 112, which is part of the second surface 124 of the roller element 112. Through this contact between the roller elements 112 and the contact elements 132, which may be slipless or non-slipless contact, the translation drives 116 may effect rotational movement of the roller elements 112 about their roller axes, which rotational movement may, in turn, be converted into a movement of the bundles with respect to the conveying path.

The translation drives 116, particularly the contact elements 132, may be positioned beneath the conveyor belt 110 in an array substantially corresponding to the array of the roller elements 112. That is, in a position of the conveyor belt 110 in which one of the roller elements 112 is aligned with respect to a contact element 132, one or more of the remaining roller elements 112 may be substantially aligned with a contact element 132. In one embodiment, in selected positions of the conveyor belt 110, each of the roller elements 112 of the bundle contacting region of the conveyor belt 110 may be in contact with a contact element 132. Alternatively, in selected positions of the conveyor belt 110, only a fraction of the roller elements 112 of the bundle contacting region of the conveyor belt 110 may be in contact with a contact element 132 such as, for example, alternating roller elements in a row or column. While the foregoing has been described with respect to embodiments in which each translation drive 116 is configured to drive only a single roller element 112 at a given position of the conveyor belt 110, it is to be appreciated that a single translation drive 116 may be configured to drive a plurality of roller elements 112, such as two or more adjacent roller elements 112.

The conversion of movement between the contact elements 132 and the roller elements 112, and between the roller elements 112 and the bundles, may be facilitated by selection of materials of the contact elements 132 and the roller elements 112 with appropriate mutual friction resistance. For example, the roller elements 112 and the contact elements 132 may be formed from, or the outer surfaces fitted with, a suitable rubber, plastic, or the like, to achieve movement conversion.

In various embodiments, the control system 60 may include any computing device known to those skilled in the art, including standard attachments and components thereof (e.g., processor, memory, sound board, input device, monitor, and the like). The computing device may include software programs or instructions stored in the memory, which are executed by the processor. The computing device may be in operative communication with, for example, the conveyor 20 to receive, for example, signals regarding the speed of the incoming bundles, the position sensors to, for example, receive signals regarding the position of bundles along the conveying path, and the orientation elements 80 to, for example, transmit instructions to effect reorienting of the bundles as they are conveyed over the bundle orienting device 50. It is to be appreciated that because each of the driven orientation elements 80 is provided with a drive system and is connected to the control system 60, each of the driven orientation elements 80 is independently actuatable relative to the other orientation elements 80. Alternatively, actuation of two or more orientation elements 80, such as a row or column of orientation elements 80, may be operatively coupled, for example, through the control system 60 and/or by being driven by the same drive system.

In illustrative embodiments, the control system 60 may be programmed to selectively and independently actuate the orientation elements 80 of the bundle orienting device 50 to achieve a desired movement path of a bundle being transported from the upstream conveyor 20a to the downstream conveyor 20b. The movement path may, for example, define a series of speeds, angular positions, and/or duration of movement of the contact elements 82 that are calculated by the control system in response to any or all of the selected layer pattern, the initial position and/or initial angular orientation of the bundle, the dimensions and geometry of the bundle, bundle material type, and the like.

Figure 9:
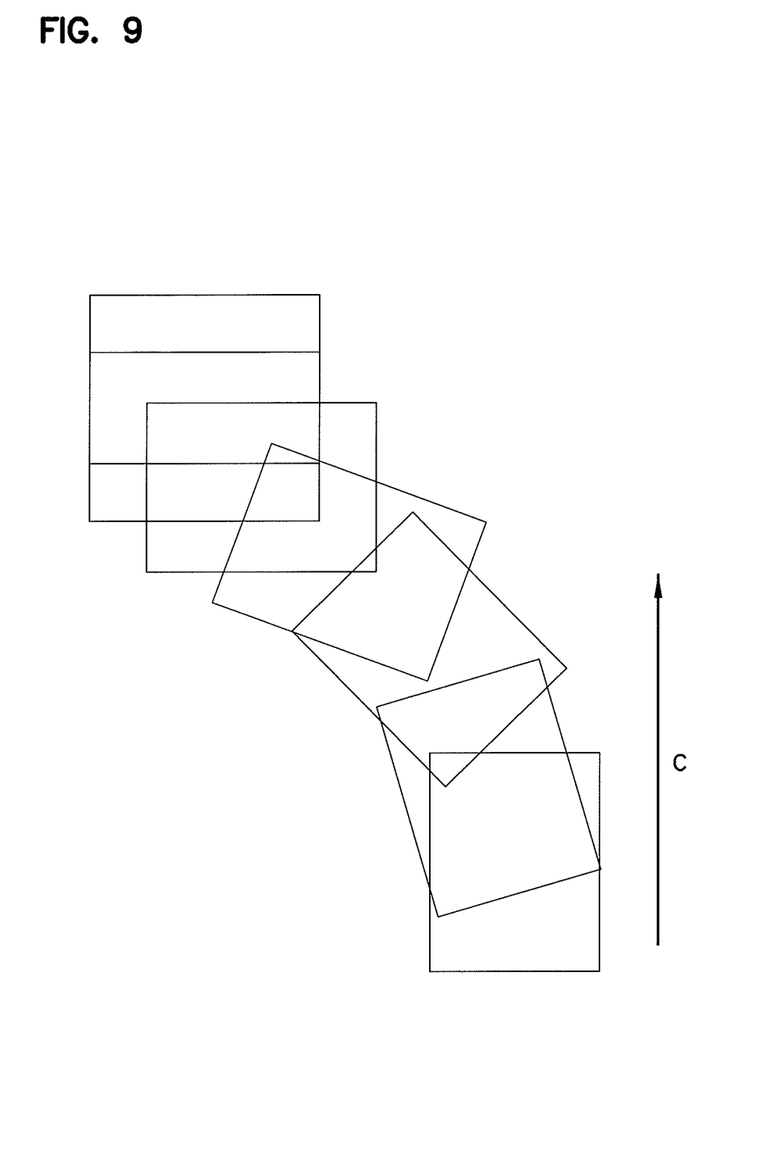
FIG. 9 depicts an elevation top view of a schematic of a bundle movement path that may be achieved by employing the apparatus and methods of the present disclosure.

Operation of the bundle orienting device 50 and a method aspect of the present disclosure can be understood and described as follows. With reference to FIGS. 4-6, in some embodiments, as the leading edge of a bundle approaches the orientation device 50, and thus one or more first orientation elements 80 (e.g., a first row of an array), the leading edge of the bundle may be detected. In response, the control system 60 may, based on, for example, a desired movement path and an initial position of the bundle, communicate a set of instructions to the orientation elements 80. The instructions may include a speed of rotation of the contact elements 82 about their roller axes, which may be carried out by manipulation of the translation drive 84, and an angular position of the contact elements 82, which may be carried out by the manipulation of the rotation drive 86. As discussed above, in some embodiments, such operating parameters of each of the plurality of contact elements 82 may be selectively and independently set by the control system 60 to achieve the desired movement path. In this manner, a desired orientation of the bundle may be achieved as the bundles are transported along the bundle orientation device 50 to the downstream conveyor 20b. FIG. 9 depicts an elevation top view of a schematic of a bundle movement path that may be achieved by employing the apparatus and methods of the present disclosure.

Because the plurality of orientation elements 80 of the orienting device 50 are selectively and independently actuatable, in one embodiment, the orienting device may accommodate reorientation of a plurality of bundles at a given point in time (i.e., a first bundle need not be conveyed completely across the length of the orienting device 50 before a subsequent bundle can be introduced to the orienting device 50 for reorienting). For example, as can be appreciated from foregoing description, after a trailing edge of a first bundle has traveled across one or more first orientation elements 80 (e.g., a first row of an array), the one or more first orientation elements are free to be actuated for reorienting a subsequent bundle, which actuation may be based on a movement path different from that of the first bundle. Reorienting a plurality of bundles at a given point in time in this manner facilitates increased production rates.

Operation of the bundle orienting device 50' and a method aspect of the present disclosure can be understood and described as follows. With reference to FIGS. 4 and 7-8, in some embodiments, as the leading edge of a bundle approaches the orientation device 50', and thus one or more first roller elements 112 (e.g., a first row of an array), the leading edge of the bundle may be detected. In response, the control system 60 may, based on, for example, a desired movement path and an initial position of the bundle, communicate a set of instructions to the translation drives 116. The instructions may include a speed of rotation of the contact elements 132 about their roller axes, which may be carried out by manipulation of the motor and gear box unit 134. In some embodiments, operating parameters of each of the translation drives 116 may be selectively and independently set by the control system 60 to achieve the desired movement path. In this manner, a desired orientation of the bundle may be achieved as the bundles are transported along the bundle orientation device 50' to the downstream conveyor 20b. The movement path depicted in FIG. 9 provides an example of a movement path that may be achieved by employing the bundle orientation device 50'.

As with the bundle orienting device 50, because the translation drives 116 and thus, the roller elements 112, of the orienting device 50' are selectively and independently actuatable, in one embodiment, the orienting device 50' may accommodate reorientation of a plurality of bundles at a given point in time. For example, as can be appreciated from foregoing description, after a trailing edge of a first bundle has traveled across one or more first translation drives 116 (e.g., a first row of an array), the one or more first translation drives 116 are free to be actuated for reorienting a subsequent bundle which is being carried by another set of roller elements 112, which actuation may be based on a movement path different from that of the first bundle.

Although the various embodiments of the present disclosure have been described with reference to preferred embodiments, persons skilled in the art will recognize that changes may be made in form and detail without departing from the spirit and scope of the present disclosure.

I claim:

1. A bundle orienting device in-line with a conveyor configured for transporting bundles in a conveying direction, the bundle orienting device comprising a plurality of selectively and independently actuatable orientation elements that, collectively, at least one of laterally and angularly displace a bundle as it travels in the conveying direction through the bundle orienting device.

2. The bundle orienting device of claim 1, further comprising a support structure comprising a plurality of apertures formed in a top surface thereof.

3. The bundle orienting device of claim 2, wherein each of the orientation elements is at least partially positioned in a support structure aperture.

4. The bundle orienting device of claim 1, wherein each of the orientation elements comprise a bundle contacting element for contacting a bundle as it travels in the conveying direction through the bundle orienting device.

5. The bundle orienting device of claim 4, wherein one or more of the bundle contacting elements are operably coupled with at least one of a translation drive and a rotation drive for controlling at least one of the orientation and rotation of the one or more bundle contacting elements.

6. The bundle orienting device of claim 5, wherein the bundle contacting elements comprise at least one of a wheel, spherical roller, and roller bar.

7. The bundle orienting device of claim 6, wherein the bundle contacting elements are formed from or are fitted with a material that facilitates the transfer of movement of the bundle contacting elements to movement of a bundle as it travels in the conveying direction through the bundle orienting device.

8. The bundle orienting device of claim 4, wherein a translation drive and a rotation drive are coupled to each of one or more bundle contacting elements for controlling the orientation and rotation of each of the bundle contacting elements.

9. The bundle orienting device of claim 1, further comprising a conveyor belt, the conveyor belt comprising the orientation elements.

10. The bundle orienting device of claim 9, wherein the conveyor belt comprises a plurality of cavities formed therein, and each of the orientation elements is rotatably accommodated in a cavity.

11. The bundle orienting device of claim 9, further comprising a translation drive disposed proximate the conveyor and substantially fixed relative thereto, for controlling at least one of the orientation and rotation of the orientation elements.

12. The bundle orienting device of claim 11, wherein the translation drive is operable coupled with one or more orientation elements via a contacting element as the one or more orientation elements are passed proximate the contacting element via the conveyor belt.

13. The bundle orienting device of claim 9, further comprising a plurality of translation drives disposed proximate the conveyor and substantially fixed relative thereto, each for controlling at least one of the orientation and rotation of one or more of the orientation elements.

14. A system for transporting and reorienting bundles, the system comprising:
    a conveyor configured for transferring bundles to a stack build zone;
    a bundle orienting device, the bundle orienting dividing the conveyor into an upstream conveyor and a downstream conveyor, the bundle orienting device comprising a plurality of selectively and independently actuatable orientation elements that, collectively, at least one of laterally and angularly displace a bundle as it travels in the conveying direction through the bundle orienting device.

15. The system of claim 14, further comprising one or more sensors for determining position information of a bundle as it as it travels in the conveying direction through at least one of the conveyor and the bundle orienting device.

16. The system of claim 15, further comprising a control system operably coupled with the one or more sensors and the bundle orienting device for controlling selective actuation of the orientation elements based at least in part on communication received from the one or more sensors.

17. A method for rotating bundles traveling in a conveying direction along a conveyor system, the method comprising conveying a bundle along a conveyor to pass through a bundle orienting device comprising a plurality of selectively and independently actuatable orientation elements that, collectively, at least one of laterally and angularly displace the bundle as it travels in the conveying direction through the bundle orienting device.

18. The method of claim 17, further comprising using one or more sensors for determining position information of the bundle as it as it travels in the conveying direction.

19. The method of claim 18, further comprising controlling selective actuation of the orientation elements through a control unit based at least in part on communication received from the one or more sensors.

20. The method of claim 19, wherein the at least one of the lateral and angular displacement of the bundle is done without stopping the conveyor.

* * * * *